United States Patent [19]

Andersen et al.

[11] Patent Number: 5,005,804
[45] Date of Patent: Apr. 9, 1991

[54] BALANCED-TORQUE BUTTERFLY VALVE
[75] Inventors: Blaine W. Andersen, Tempe; John N. Tervo, Scottsdale, both of Ariz.
[73] Assignee: Allied-Signal Inc., Morris Township, Morris County, N.J.
[21] Appl. No.: 534,091
[22] Filed: Jun. 6, 1990
[51] Int. Cl.$^5$ .............................................. F16K 1/22
[52] U.S. Cl. .................................... 251/215; 251/228; 251/248; 251/283; 251/308; 251/215
[58] Field of Search ............... 137/1; 251/56, 58, 215, 251/218, 227, 228, 281, 283, 305, 308, 248

[56] References Cited

U.S. PATENT DOCUMENTS

| 212,556 | 2/1879 | Johnson . |
| 443,326 | 12/1890 | Leverich . |
| 965,322 | 7/1910 | Peterson . |
| 1,167,145 | 1/1916 | Baverey . |
| 1,328,565 | 1/1920 | Howard . |
| 1,541,047 | 6/1925 | Hart . |
| 1,744,798 | 1/1930 | Price . |
| 2,051,881 | 8/1936 | Mock . |
| 2,095,263 | 10/1937 | Moss . |
| 2,271,390 | 1/1942 | Dodson . |
| 2,796,082 | 6/1957 | Green et al. . |
| 2,833,511 | 5/1958 | Fletcher . |
| 2,910,266 | 10/1959 | Condello ........................ 251/56 X |
| 2,910,266 | 10/1959 | Condello et al. . |
| 3,008,685 | 11/1961 | Rudden . |
| 3,062,232 | 11/1962 | McGay . |
| 3,065,950 | 11/1962 | Goldberg ........................ 251/160 |
| 3,065,950 | 11/1962 | Goldberg . |
| 3,200,838 | 8/1965 | Sheaffer . |
| 3,298,659 | 1/1967 | Cupedo . |
| 3,344,808 | 10/1967 | Cary . |
| 3,400,907 | 9/1968 | Horn et al. . |
| 3,442,489 | 5/1969 | Cary et al. . |
| 3,516,640 | 6/1970 | Bryer et al. . |
| 3,545,486 | 12/1970 | Larson . |
| 3,675,681 | 7/1972 | Obermaier . |
| 3,677,297 | 7/1972 | Walton . |
| 3,794,288 | 2/1974 | Dodler et al. . |
| 3,960,177 | 6/1976 | Baumann . |
| 3,971,414 | 7/1976 | Illing . |
| 3,982,725 | 9/1976 | Clark . |
| 3,993,096 | 11/1976 | Wilson . |
| 4,084,617 | 4/1978 | Happe . |
| 4,093,180 | 6/1978 | Strabala ........................... 251/248 |
| 4,190,074 | 2/1980 | Mailliet et al. . |
| 4,313,592 | 2/1982 | Baas . |
| 4,367,861 | 1/1983 | Bray et al. . |
| 4,508,132 | 4/1985 | Mayfield, Jr. et al. . |
| 4,534,538 | 8/1985 | Buckley et al. . |
| 4,556,192 | 12/1985 | Ramisch . |
| 4,586,693 | 5/1986 | Tinner . |
| 4,706,706 | 11/1987 | Page et al. . |
| 4,712,768 | 12/1987 | Herr et al. . |
| 4,840,349 | 6/1989 | Peter ............................... 251/248 X |

FOREIGN PATENT DOCUMENTS 0320490 5/1986 Fed. Rep. of Germany .
2821766 11/1979 Fed. Rep. of Germany .
1533073 11/1978 United Kingdom .

OTHER PUBLICATIONS

"Fishtail vs. Conventional Discs in Butterfly Valves", Carl D. Wilson, Instruments & Control Systems, vol. 41; Mar. 1968.
"The Note On The Reduction Of The Fluid Dynamic Torque of Butterfly Valves", D. W. Bryer/D. E. Walshe, National Physical Laboratory; Sep. 1986.

Primary Examiner—Robert G. Nilson
Attorney, Agent, or Firm—Joseph R. Black; James W. McFarland; Robert A. Walsh

[57] ABSTRACT

A balanced-torque butterfly valve (40) incorporates a pivot mechanism (52) designed to provide for bimodal movement of the valve plate (42). The valve plate (42) has a cavity (54) formed therein to receive the pivot mechanism (52) and to accommodate translational movement of the valve plate relative to the mechanism. This eliminates fluid dynamic effects that would be produced if the mechanism were positioned in the flow path (44) and external to the valve plate (42). The pivot mechanism (52) comprises a center shaft (70) rotatable relative to the valve plate (42), and a carrier shaft (72) which is in fixed rotational relation to the valve plate (42) and extends through the mounting body (46). This permits both translational movement of the valve plate (42), and detection of its rotational position from a vantage point outside of the flow path (44). In addition, the carrier shaft (72) cooperates with bearings (104) to minimize load-bearing requirements of rack and pinion gears (64, 66, 116, 118) which are used to convert rotational movement of the center shaft (70) to translational movement of the valve plate (42).

25 Claims, 6 Drawing Sheets

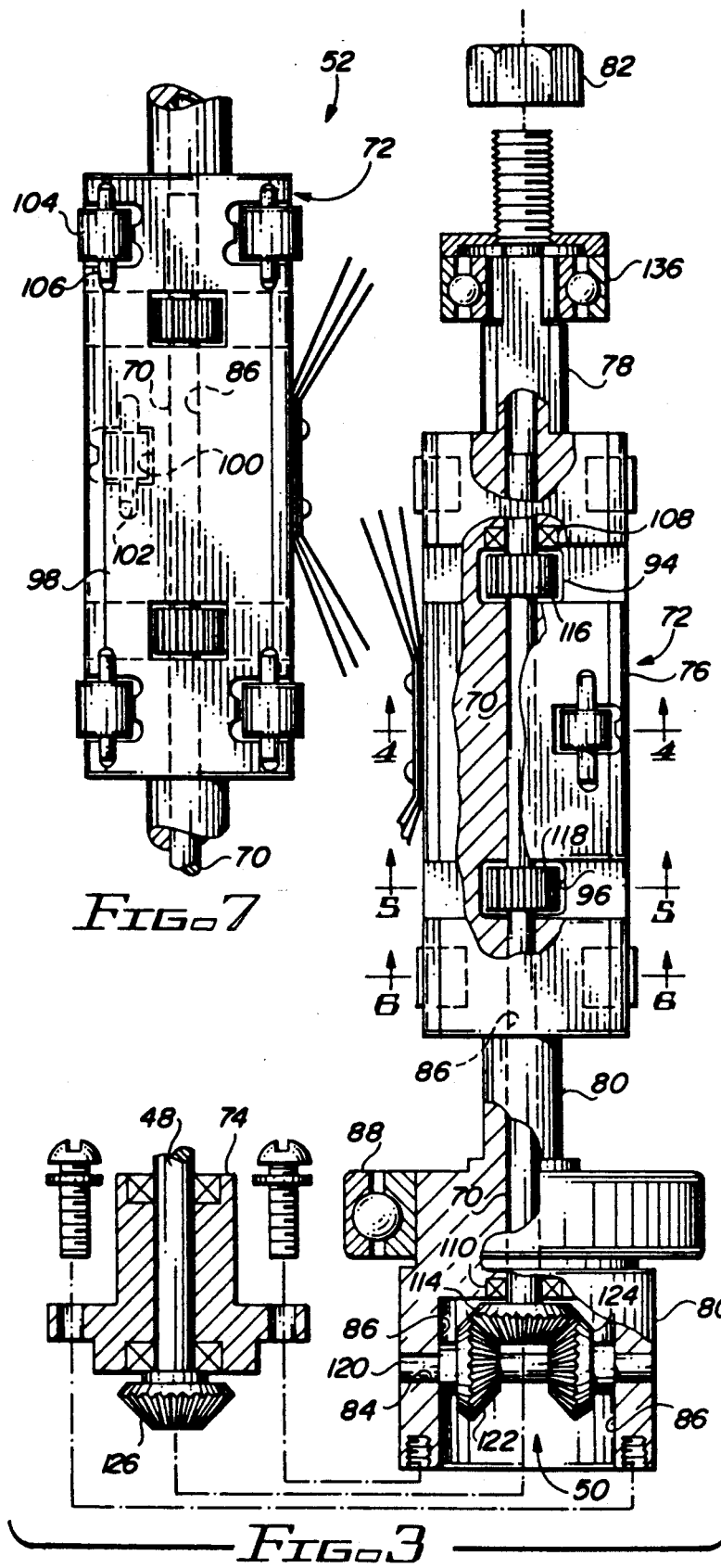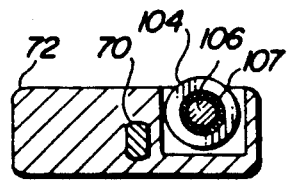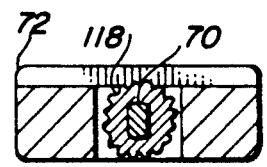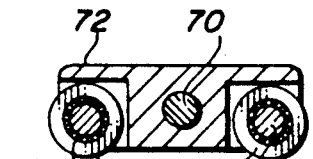

BALANCED-TORQUE BUTTERFLY VALVE

Reference is made to the following copending and commonly-owned U.S. patent applications which disclose balanced-torque valves Ser. No. 374,897, filed on 6/30/89; Ser. No. 395,234, filed on 8/17/89; Ser. No. 422,354, filed on 10/16/89; and Ser. No. 426,921, filed on 10/24/89.

TECHNICAL FIELD

This invention relates generally to butterfly valves, and more specifically to those which incorporate structure that permits translational movement of the valve plate relative to the pivot mechanism.

BACKGROUND OF THE INVENTION

In butterfly valves, translational movement of the valve plate relative to the pivot mechanism can be used to effect dynamic torque balancing, and to facilitate actuation by using the torque exerted by fluid on the plate to rotate the latter. To applicant's knowledge, these principles were first set forth in the above-referenced patent application Ser. No. 374,897, filed on 6/30/89. They are schematically illustrated in FIGS. 12A–12C of the present application, wherein numerals 20, 22, 24, 26, and 28 indicate a valve plate, a pivot shaft, a duct, a bracket intersecuring the shaft and plate, and the direction of flow respectively. Arrow 30 and numeral 32 indicate the center of pressure associated with the forces exerted by fluid on the plate 20, and the pivot line about which the plate is rotatable.

In FIG. 12A, the shaft 22 is centered in relation to the longitudinal dimension of the plate 20 and the plate is in a closed position The center of pressure 30 is aligned with the pivot line 32, so the net torque exerted by the fluid on the plate 20 is zero. If the plate 20 is rotated to an open position as illustrated in FIG. 12B, and translated relative to the shaft 22 so that the center of pressure 30 is aligned with the pivot line 32 as illustrated in FIG. 12C, then the plate is effectively torque-balanced and the flow rate associated with the rotational angle 34 can be maintained with minimal input force required from the actuator 36. If the translational movement is too limited in range to achieve torque balancing at all rotational positions of the plate 20, it can still be used to advantage in minimizing the net torque exerted by the fluid, thus still minimizing the input force required from the actuator 36.

If it is desired to change the rotational angle 34, then the plate 20 can be translated relative to the shaft 22 in the appropriate direction to effect a misalignment of the center of pressure 30 with the pivot line 32, thus increasing the net fluid dynamic torque, and the force required to effect the change is exerted in whole or in part by the fluid conveyed in the duct 24.

Butterfly valves that are designed to provide for translational movement of the plate 20 relative to the shaft 22, for either or both of the above-described purposes, are referred to herein as "balanced-torque" butterfly valves.

The balanced-torque butterfly valves illustrated in FIGS. 12A–12C may have disadvantages in some applications. Since the bracket 26 and shaft 22 protrude from the plate 20, the structure as a whole is not well streamlined from a fluid dynamics perspective. This may result in application-dependent problems which are believed to be attributable to the effect of the shaft 22 and bracket 26 as flow restrictors. For example, in tests conducted for balanced-torque butterfly valves which have the shaft 22 positioned on the downstream side of the plate 20, the plate maintained a stable equilibrium position when partially open, but stability was dependent on pressure ratio (i.e. inlet/outlet air pressure). Above a critical pressure ratio, the plate 20 would latch open (i.e. move suddenly to a rotational angle 34 of about ninety degrees). When the valve was tested with the shaft 22 on the upstream side of the plate 20 as indicated in FIGS. 12, considerable stability was observed for rotational angles 34 ranging from zero to slightly in excess of sixty degrees Attempts to rotate the plate 20 out of an equilibrium position (i.e. a position at which the plate is translated relative to the shaft such that the center of pressure 30 is substantially aligned with the pivot line 32) were met with considerable aerodynamic torque resistance.

The current thinking is that the overall exterior shape of the valve plate 20 is the important variable in controlling the latching phenomenon, whereas resistance to rotational movement away from an equilibrium position is best controlled by translationally moving the plate out of the equilibrium position in order to facilitate rotation. In one aspect of the present invention, the latching problem is simplified by eliminating the fluid dynamic effects of the shaft 22 and the bracket 26.

Another disadvantage of previously described balanced-torque butterfly valves is that they sometimes are not well suited for providing feedback regarding the rotational position of the valve plate. That is, it is difficult to sense the rotational position of the valve plate from a location outside the duct unless the pivot shaft is in fixed rotational relationship with the valve plate. In addition, it may be desirable in many applications to provide for both rotational and translational movement of the valve plate via external actuation. A second aspect of the invention resides in the provision of a pivot mechanism which may be adapted to provide for both types of movement via external actuation, while simultaneously providing a ready means for determining the rotational position of the valve plate.

Another disadvantage relates to power transmission between the pivot shaft 22 and the plate 20. One method for translationally moving the plate 20 is to provide rack and pinion gears on the plate and shaft, respectively. However, when the plate 20 is subjected to pressure exerted thereon by the fluid conveyed in the flow path, the gears bear substantially the entire load. This may result in binding, and will almost certainly result in accelerated wear. A third aspect of the invention pertains to minimizing the load-bearing requirements of such power transmission components.

SUMMARY OF THE INVENTION

The invention is a butterfly valve. In general, such valves comprise a mounting body which defines a flow path for a fluid to be conveyed therethrough, a valve plate that is pivotally supported in the mounting body so that the plate can be rotationally moved to modulate fluid flow, and a pivot shaft supported in the mounting body and supporting the valve plate. This invention pertains to balanced-torque butterfly valves as described in the previous section.

In a first aspect of the present invention, the valve plate has a cavity formed therein, the cavity being appropriately shaped and dimensioned in relation to the pivot shaft to accommodate both receipt of the pivot shaft therein and translational movement of the valve plate relative to the pivot shaft. This arrangement provides the advantages associated with translational movement (the translational movement being in a direction substantially parallel to the plate) while removing the effect of the pivot shaft and other components as flow restrictors. Preferably, power transmission means for converting rotational movement of the pivot shaft to translational movement of the valve plate are also disposed in the cavity and secured to the pivot shaft and valve plate.

In a second aspect of the invention, the valve plate is supported in the flow path by a pivot mechanism which may be adapted to provide for bimodal movement of the valve plate. The pivot mechanism comprises a carrier shaft which is in fixed rotational relation to the valve plate and extends through the mounting body to provide a ready means of determining the rotational position of the plate, and a center shaft which is rotatable relative to the plate in order to provide for translational movement of the latter. The center shaft can be used in conjunction with a suitable gearing arrangement to translate the plate relative to the pivot mechanism, while the carrier shaft can be used to effect rotation.

A third aspect of the invention resides in the provision of a carrier, irrespective of whether the carrier is employed as a shaft to rotate the valve plate and/or provide position feedback as described above. The center shaft extends longitudinally through the carrier and is rotatable relative thereto. The carrier is appropriately designed to accommodate power transmission from the center shaft to the valve plate. In this or in functionally similar arrangements, the carrier can function as a load-bearing element that facilitates translational movement. This results from elimination of binding which might otherwise occur if power transmission components are required to bear the pressure exerted by fluid on the valve plate.

BRIEF DESCRIPTION OF THE DRAWINGS

FIG. 3 is a partially elevational, partially cross-sectional, and partially exploded view of various components illustrated in FIG. 2, including a pivot mechanism and a differential gear.

FIGS. 4–6 are cross-sectional views taken along the lines indicated in FIG. 3.

FIG. 7 is an elevational and truncated view of the pivot mechanism.

DESCRIPTION OF THE PREFERRED EMBODIMENT

Figure 1:
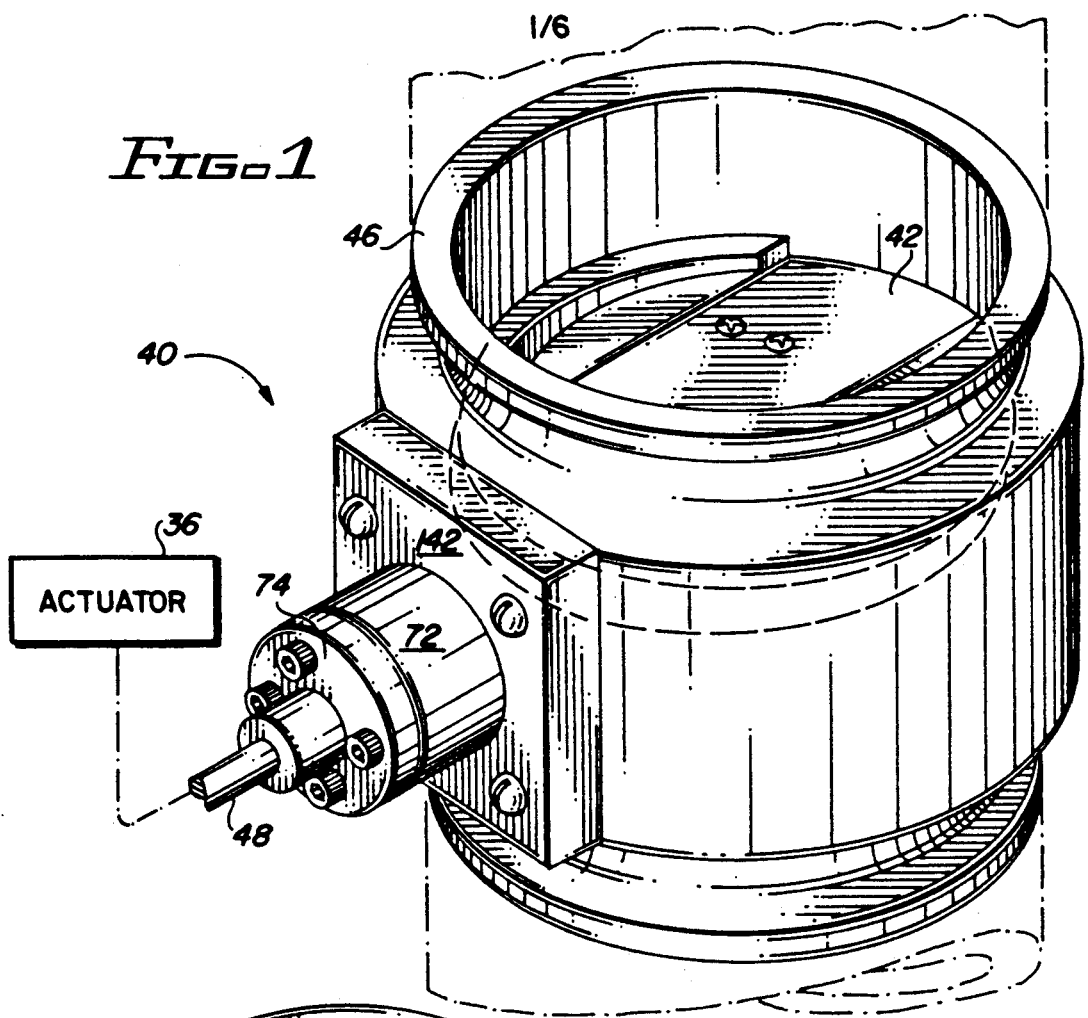
FIG. 1 is a perspective view of an assembled butterfly valve. Actuation of the valve is diagrammatically represented.
Figure 10:
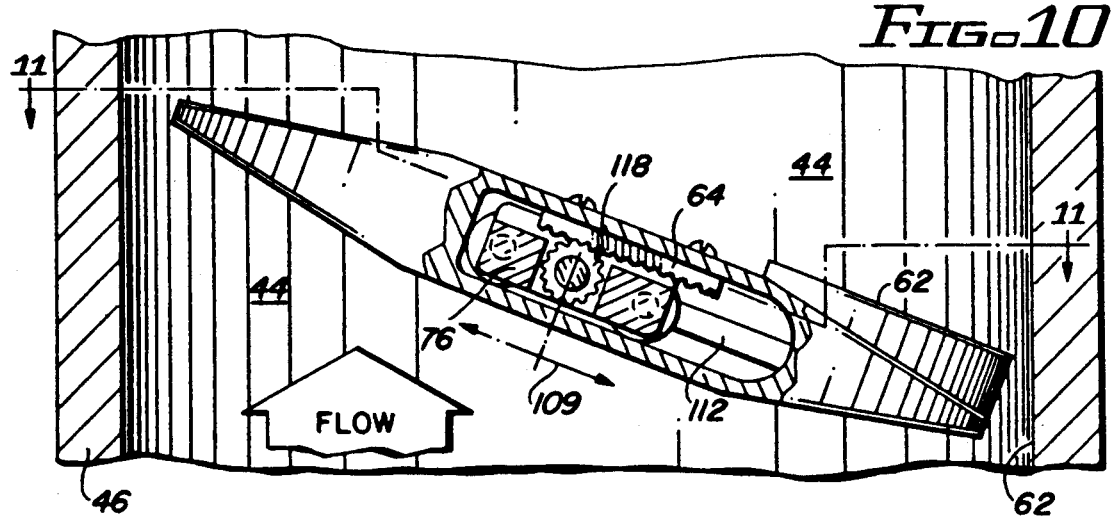
FIG. 10 is a partial, cross-sectional and partially elevational view of the butterfly valve, as viewed in a direction parallel to both the valve plate and the pivot mechanism.
Figure 11:
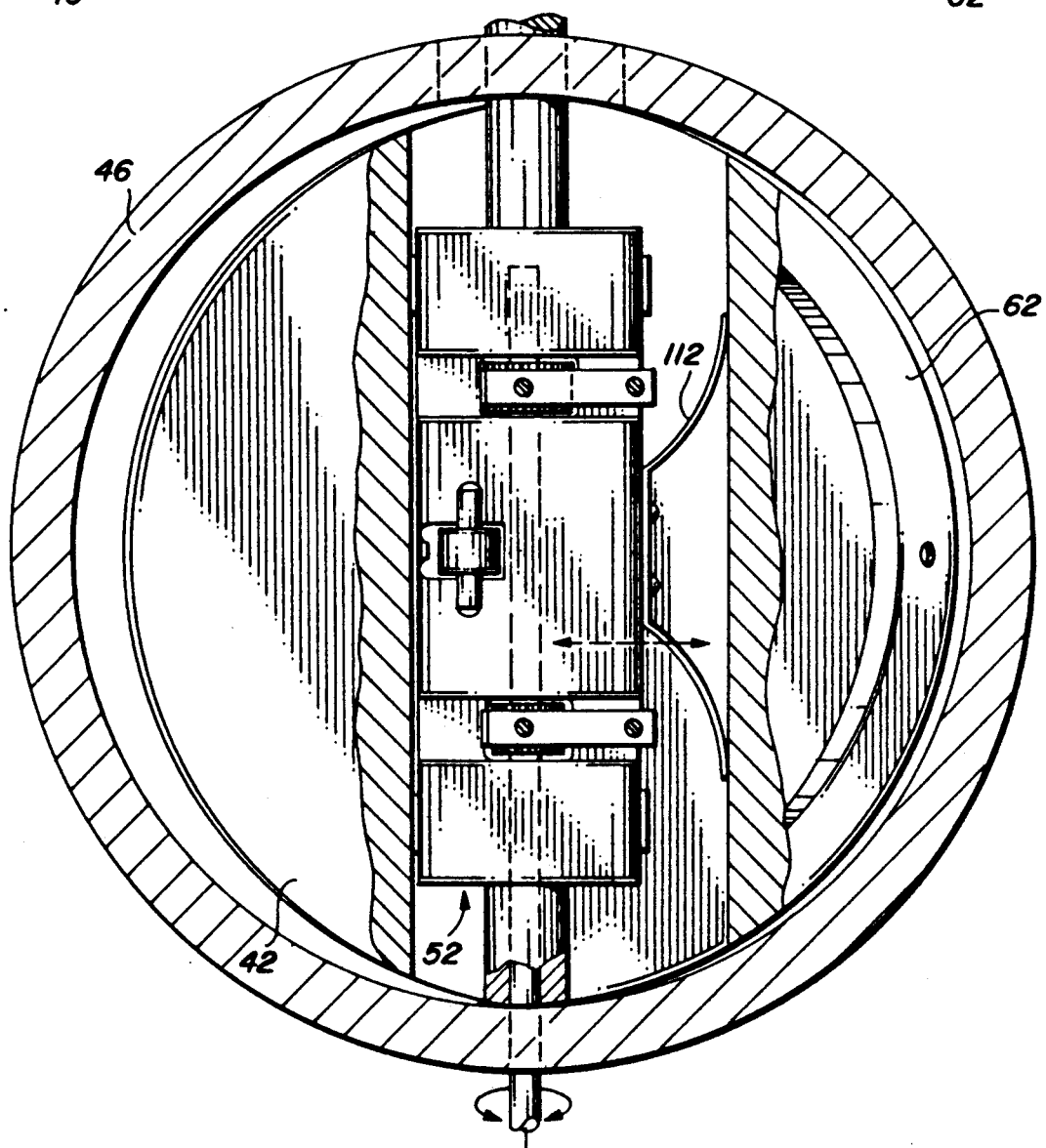
FIG. 11 is an elevational and partially fragmented view taken along lines 11—11 of FIG. 10.

FIG. 1 of the accompanying drawings illustrates a butterfly valve 40 which is operable via an external actuator 36 to control the position of a valve plate 42. The valve plate 42 is pivotally disposed in and transects a flow path 44 (FIG. 10) defined by a mounting body 46.

In use, duct members (not shown) are secured to the mounting body 46 to define an elongate flow path along which a fluid is conveyed from a source thereof, through the valve 40, and to one or more points of use. Fluid flow is controlled by rotationally positioning the valve plate 42. The positioning is achieved in response to torque applied by the actuator 36 to an input shaft 48. This torque is transmitted through a differential gear 50 (FIG. 3—hereinafter, "differential") to a pivot mechanism 52 (FIG. 7) which pivotally supports the valve plate 42 and is journalled in the mounting body 46.

Figure 8:
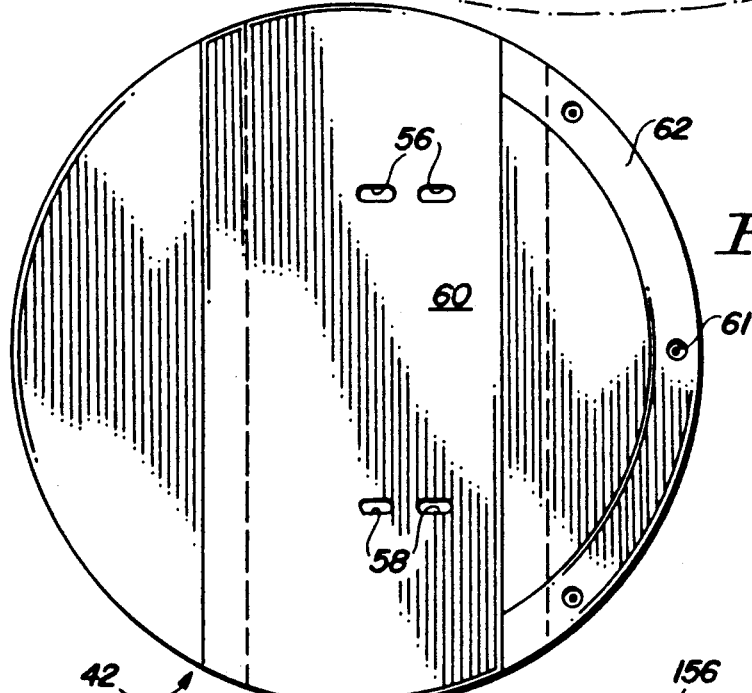
FIG. 8 is a top elevation of the valve plate illustrated in FIGS. 1 and 2.
Figure 9:
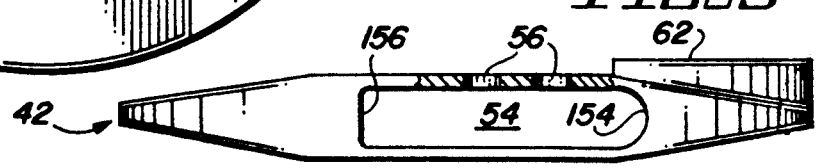
FIG. 9 is a side elevation, in partial cross-section, of the valve plate illustrated in FIG. 8.

FIGS. 8 and 9 illustrate the valve plate 42 in more detail. The diameter of the circular valve plate 42 is slightly less than the inside diameter of the mounting body 46 in order to accommodate translational movement of the plate in the flow path 44. Translational movement of the valve plate 42 relative to the pivot mechanism 52 (FIG. 7) is accommodated by a suitably dimensioned cavity 54 extending through the plate as indicated. Slots 56, 58 are formed between the downstream-facing surface 60 of the plate and the cavity 54. Small tapped bores (not shown) extending into the plate receive screws 61 that secure an arcuate fence 62 to the plate near the leading edge of the latter. The slots 56, 58 are provided for securement of a pair of rack gears 64, 66 (FIG. 2) to the plate 42.

Figure 2:
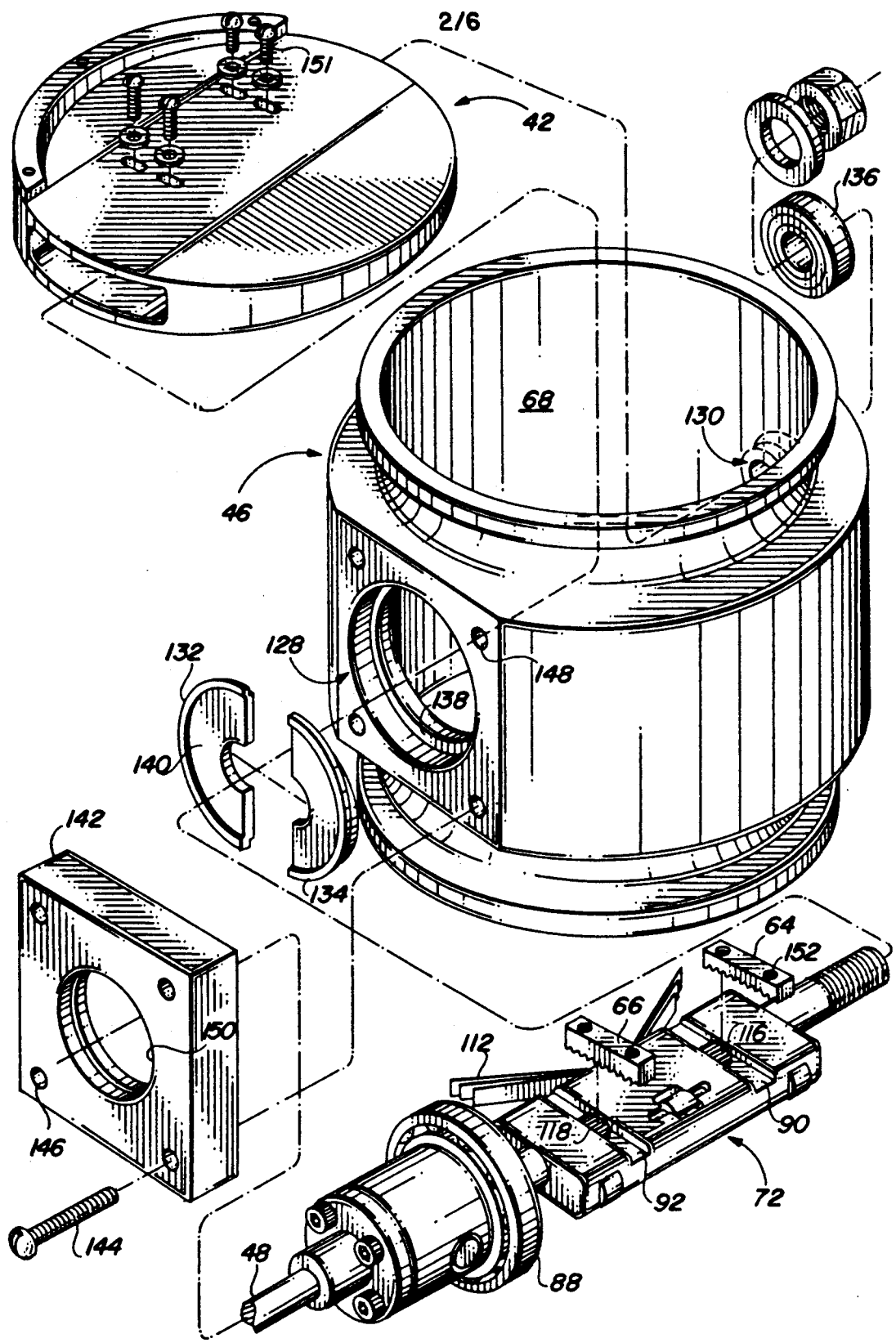
FIG. 2 is an exploded perspective view of the butterfly valve illustrated in FIG. 1.

FIGS. 2, 3, and 7 illustrate the pivot mechanism 52 and differential 50 in detail. The pivot mechanism 52 comprises a center shaft 70 and a carrier shaft 72 (hereinafter, "carrier"). The carrier 72 has a centrally-disposed oblong portion 76 and two cylindrical end portions 78, 80. One end portion 78 is threaded for engagement with a nut 82, and the other end portion 80 has a transversely-extending bore 84 formed therethrough. A longitudinally-extending stepped bore 86 is formed in the carrier 72 to accommodate receipt of the center shaft 70 and to provide a housing for the differential 50. The bore 86 is sufficiently large in diameter to permit rotation of the center shaft 70 therein. Transverse slots 90, 92 are milled in the central portion 76, and through-slots 94, 96 are formed from the transverse slots to the upstream-facing surface 98 of the carrier. The through-slots 94, 96 intersect the longitudinally extending bore 86 as indicated. Five deep recesses (as at 100) and associated cross-slots (as at 102) are milled in the carrier 72 for installation of five rollers (as at 104). Each roller 104 is rotatably secured to a small shaft (as at 106) via needle bearings 107 (FIG. 6). The shaft 106 is force-fitted in the cross-slot 102. The rollers 104 function as bearings to minimize friction between the carrier 72 and the valve plate 42 during translational movement 109 (FIG. 10) of the latter. The longitudinally-extending bore 86 is enlarged at two locations and bearings 108, 110 are inserted. A bearing 88 is also pressed onto the cylindrical portion 80 as shown. A leaf spring 112 is rigidly secured to the edge of the carrier 72 via screws extending into tapped bores. (Note: Although the illustrated prototype incorporates the leaf spring 112, it is believed that a more robust biasing mechanism is preferable for most applications. Accordingly, the leaf spring 112 can be replaced by two suitably mounted and positioned coil springs, or such other functionally equivalent biasing means as are required in a given application).

A first bevel gear 114 of the differential 50 is pressed onto the center shaft 70 near the indicated end which extends into the differential housing. The center shaft 70 is received in the longitudinally-extending bore 86 and extends through the bearings 108, 110, and through two pinion gears 116, 118 positioned in the through-slots 94, 96 as illustrated.

A cross-shaft 120 is pressed through the cross-bore 84 and through needle bearings (not shown) received in the axial bores (not shown) of second and third bevel gears 122, 124. The fourth bevel gear 126 of the differential 50 is pressed onto the input shaft 48. The input shaft 48 extends through a stepped axial bore in an end cap 74 and is pressed through bearings seated in the latter. The end cap 74 is then secured to the end of the carrier 72 as indicated, with the fourth bevel gear 126 engaging the second and third 122, 124, and the latter two engaging the first 114 to form the differential 50.

It will be understood that the first and fourth bevel gears 114, 126 are rigidly secured to the center shaft 70 and input shaft 48, respectively, whereas the second and third bevel gears 122, 124 are rotatably secured to the cross-shaft 120. When rotational torque is applied to the input shaft 48, it is transmitted through the differential 50 to the center shaft 70. If the center shaft 70 is free to rotate, then it will do so in response to rotation of the input shaft 48. However, if the center shaft 70 is constrained from rotating, then the torque is transmitted to the carrier 72 via the cross-shaft 120.

The rack gears 64, 66 are positioned in the transverse slots 90, 92 and in engagement with the pinion gears 116, 118. The valve plate 42 is held inside the mounting body 46 and the leaf spring 112 is depressed as the pivot mechanism 52 is extended through an access port 128 and the cavity 54 (FIG. 9) until the threaded end portion 78 projects through on opposite port 130 formed through the mounting body.

Two semi-annular baffles 132, 134 are positioned around the carrier 72 between the bearing 88 and the central portion 76, and against an annular rim or boss 138 of the mounting body 46. The inside-facing surfaces (those not visible in FIG. 2) of the baffles 132, 134 are contoured to conform with the inner surface 68 of the mounting body 46, and the surfaces are flush when the baffles are positioned as described.

The pivot mechanism 52 is further extended through the cavity 54 until the bearing 88 abuts an annular land 140 defined by the baffles 132, 134. A cover plate 142 abuts the opposite side of the bearing 88 and is secured to the mounting body 46 via screws (as at 144) extending through bores (as at 146) and into tapped bores (as at 148). The cover plate 142 circumferentially surrounds the end portion 80 and the latter, along with the input shaft 48, projects through a central bore 150 in the cover plate.

The rack gears 64, 66 are rigidly secured to the valve plate 42 via screws (as at 151) extending through the slots 56, 58 (FIG. 8) and into tapped bores (as at 152) formed in the rack gears. A bearing 136 is pressed into the port 130 between the cylindrical portion 78 and the mounting body 46, and the pivot mechanism 52 is finally secured by tightly engaging the nut 82 with the threaded end portion 78.

When the valve 40 is assembled, the center shaft 70 is centered in relation to the valve plate 42 so that, in use, the net fluid dynamic torque is substantially zero when the plate is in a closed position. The leaf spring 112 is preloaded and abuts one transversely-extending, inside surface 154 (FIG. 9) of the valve plate 42, while the rollers 104 on the other end of the carrier 72 abut the opposite transversely-extending, inside surface 156. At all times, the rollers 104 collectively abut both oppositely-facing and longitudinally-extending inside surfaces (not referenced by numerals, these are the surfaces which are generally parallel to the valve plate as viewed in FIGS. 9 and 10) of the valve plate 42. Accordingly, the carrier 52 and rollers 104 cooperate to bear the pressure exerted by fluid on the valve plate so that load-bearing by the rack and pinion gears 64, 66, 116, 118 is limited to that associated with power transmission. This is a distinct advantage provided by the carrier 52 and is usable in embodiments other than that illustrated. For example, the carrier 52 could be limited to the centrally-disposed portion 76, and the center shaft 70 could be journalled in the mounting body 46 and directly actuated (i.e. without using the differential 50). In that embodiment, the center shaft 70 serves as the pivot shaft and the forementioned advantage of the carrier is preserved.

When the input shaft 48 is rotated, the rotational torque is transferred to the center shaft 70 and the normal response, in the absence of the leaf spring 112, is rotation of the center shaft 70. Rotation of the center shaft 70 is accompanied by translational movement 109 of the valve plate 42 relative to the carrier 72 via coaction of the rack and pinion gears 64, 66, 116, 118. If the translational movement is impeded sufficiently to prevent rotation of the center shaft 70, then the response to rotation of the input shaft 48 is rotation of the carrier 72 and, consequently, rotation of the valve plate 42. Since the oblong portion 76 of the carrier 72 is generally conformal with the cavity 54 (allowing, however, for translational movement and the provision of rollers 104), the valve plate 42 and carrier coact to rotate together when either is rotated; and since the cylindrical end portion 80 of the carrier extends outwardly from the flow path 44 and through the mounting body 46, the rotational position of the valve plate is easily ascertainable from the exterior of the mounting body by reference to the rotational position of the carrier.

Impedance of translational movement can occur without use of the leaf spring 112 when the valve plate 42 is in the closed position, since the plate is then forced edgewise against the inside surface 68 of the mounting body 46. However, such an arrangement requires considerably higher initial opening torque since the impedance is accompanied by frictional forces between the mounting body 46 and valve plate 42. Accordingly, a biasing mechanism is employed so that rotational movement is the normal response when the valve plate 42 is moved from the closed position. In open rotational positions, the valve plate 42 moves rotationally in response to rotation of the input shaft 48 so long as impedance to rotational movement—the impedance resulting from net fluid dynamic torque—is insufficient to overcome the impedance to translational movement that results from the spring force. When the impedance to rotational movement is sufficiently high, (i.e. when the center of pressure 30 is sufficiently misaligned with the pivot line 32 as illustrated in FIGS. 12, the pivot line of the preferred embodiment being the longitudinal axis of the carrier 72), then the valve plate 42 moves translationally to decrease the net torque until the impedance is again insufficient to overcome that resulting from the spring force.

Figure 13:
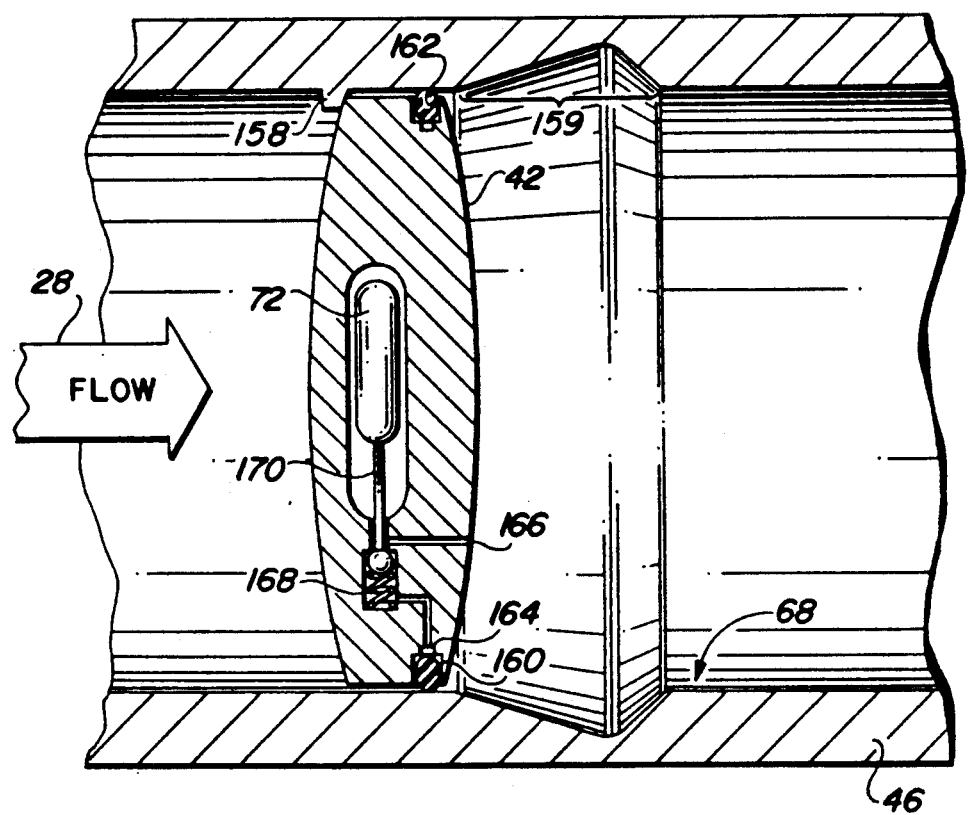
FIG. 13 is a schematic illustration wherein the butterfly valve incorporates a contemplated sealing arrangement in an application demanding a sealing function.

In applications which demand sealing in the closed rotational position, a conventional rim seal can be provided around the circumferential periphery of the valve plate 42. This may limit translational movement too much, which in turn may require suitable shaping of the inside surface 68 of the mounting body 46 in order to accommodate the required movement. Alternatively, a suitably shaped inside surface 46 in combination with conventional face seals may be workable. FIG. 13 illustrates a contemplated arrangement in which fluid communication is sealingly closed with the valve plate 42 at a rotational angle of approximately zero. The mounting body 46 is adapted to provide a suitable stop 158 in order to prevent undesired rotational movement of the valve plate 42. To accommodate translational movement, the inside surface 68 of the mounting body 46 is radially extended over a range 159 immediately downstream from an annular recess 160 formed in the circumferential edge of the valve plate 42. The recess 160 is offset from the carrier 72 to provide circumferentially continuous sealing. A seal 162 is seated in the recess 160 and abuts the inside surface 68. A potential difficulty in butterfly valves which employ rim seals in high-pressure-ratio applications is that the high-pressure fluid on the upstream side of the valve plate 42 gets between the recess 160 and the seal 162. The fluid exerts radially outward force on the seal 162, which puts the seal in more aggressive contact with the inside surface 68. While that effect may be desirable for sealing purposes, it has the undesirable consequence of increasing the torque required to initially open the valve. Accordingly, in the FIG. 13 arrangement the valve plate 42 is adapted to provide one-way fluid communication from the recess 160 to the downstream side of the plate in order to relieve the forementioned outward pressure exerted on the seal 162. This is accomplished by forming an inner annulus 164 which fluidically connects the recess 160 to a flow passage 166. The passage 166 extends from the annulus 164 to the downstream-facing surface of the valve plate 42, and is blocked by a check valve 168. A push rod 170 is rigidly secured to the carrier 72 and is in contact with the check valve 168 so that a very slight translational movement of the valve plate 42 results in opening the check valve. In the closed position illustrated, the seal 162 impedes rotational movement of the valve plate 42 to a greater degree than the spring 112 (FIG. 2) impedes translational movement. Accordingly, when the valve plate 42 is sealingly closed as shown, rotation of the input shaft 48 (FIG. 2) results in rotation of the center shaft 70, and the valve plate is translated very slightly relative to the carrier 72. This slight translational movement opens the check valve 168, thus relieving the radially outward pressure exerted on the seal 162 and decreasing impedance to rotational movement of the valve plate 42. Use of the check valve 168 for both biasing (i.e. as an equivalent to the leaf spring 112 of FIG. 2) and seal-venting purposes is a possibility that has not been fully explored.

It should be understood that although a circular valve plate 42 is illustrated, the invention is equally applicable in a rectangular valve plate/rectangular duct arrangement, and that the term "butterfly valve" as used herein is intended to include such structures.

Figure 12A:
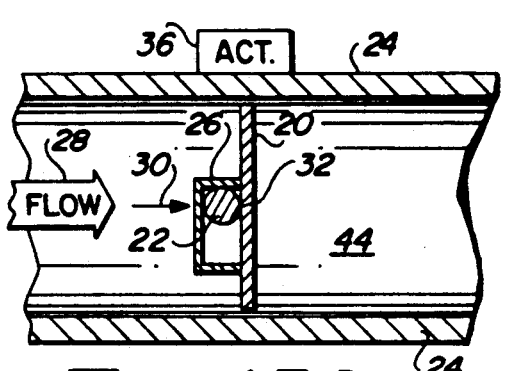
FIGS. 12A–12H are schematic illustrations of a balanced-torque butterfly valve showing various rotational and translational positions of the valve plate. These are provided to illustrate the principles and use of a butterfly valve as disclosed herein.
Figure 12B:
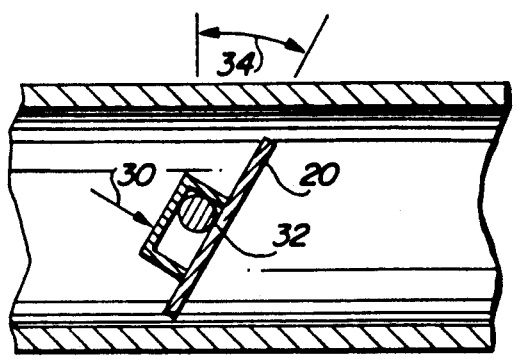
Figure 12C:
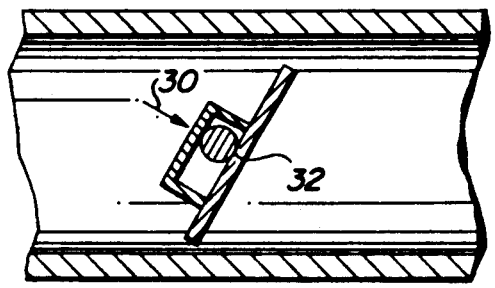
Figure 12D:
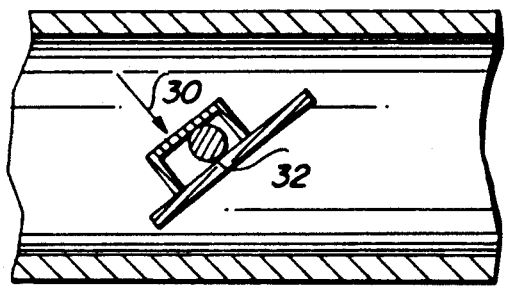
Figure 12E:
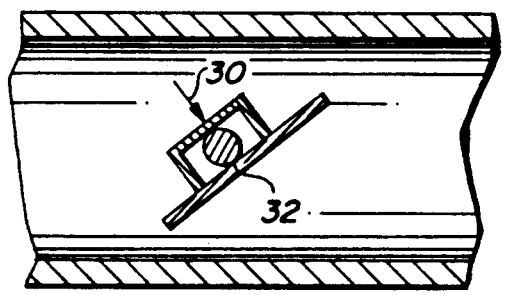
Figure 12F:
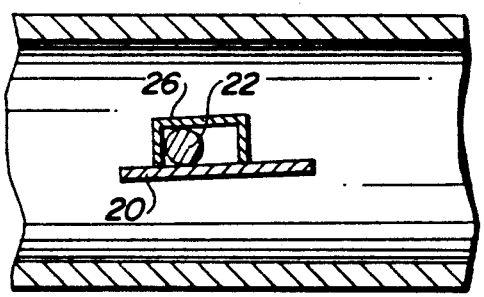

Use of the valve 40 will now be described with reference to FIGS. 12A-12F. The valve plate 20, which is initially at a first rotational position (FIG. 12A) maximally closing fluid communication along the flow path 44, is rotationally moved away from the first position toward a second rotational position (FIG. 12F) maximally permitting fluid communication. The valve plate 20 is subjected to a net torque exerted by the fluid conveyed along the path 44 and the torque increases with the rotational movement as the center of pressure 30 moves below the pivot line 32, this being illustrated in FIG. 12B. The valve plate 20 is translationally moved relative to the shaft 22 so that the center of pressure 30 is more closely aligned with the pivot line 32, thus decreasing the net torque, as illustrated in FIG. 12C. Continued rotational movement toward the second position (FIG. 12F), facilitated by the translational movement, is effected with a concomitant increase in the net torque as the center of pressure 30 again moves relative to the pivot line 32, this being illustrated in FIG. 12D. Continued translational movement again more closely aligns the center of pressure 30 with the pivot line 32 so that further rotational movement toward the second position (FIG. 12F) is facilitated, as indicated in FIG. 12E.

Rotational movement of the valve plate 20 continues until the plate reaches a desired rotational position (as in FIG. 12E) associated with a desired flow rate. The translational movement facilitates the rotational movement and, since the net torque exerted by the fluid on the plate is minimized via the translational movement, minimizes the load on the actuator 36 at the desired rotational position.

The overall movement of the valve plate is characterized by both rotational and translational components, although it may be substantially continuous between one rotational position and another. Thus, the progression indicated by FIGS. 12A-12E exaggerates the discreteness of successive translational or rotational components, to the end of providing an easily understood illustration of the overall movement.

Figure 12G:
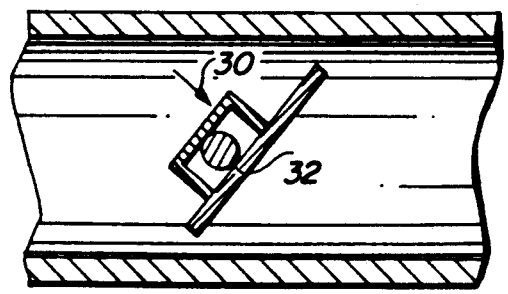
Figure 12H:
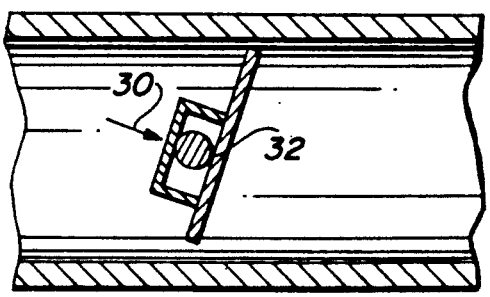

FIGS. 12G and 12H illustrate the movement in reverse. That is, starting from a rotational position such as that illustrated in FIG. 12E where the valve plate 20 is substantially torque-balanced, the plate is rotationally moved toward the first position (FIG. 12A), thus effecting a greater degree of misalignment between the center of pressure 30 and the pivot line 32, as illustrated in FIG. 12G. The valve plate 20 is also translationally moved as illustrated in FIG. 12H to effect a lesser degree of misalignment, thus facilitating further rotational movement toward the first position.

The reader should understand that the foregoing portion of the description, which description includes the accompanying drawings, is not intended to restrict the scope of the invention to the preferred embodiment thereof or to specific details which are ancillary to the teaching contained herein. The invention should be construed in the broadest manner which is consistent with the following claims and their equivalents.

What is claimed is:

1. A butterfly valve, comprising:
   a mounting body defining a flow path for a fluid to be conveyed therethrough;
   a valve plate disposed in the flow path and pivotally supported therein;

pivot means for pivotally supporting the valve plate in the path; the valve plate being supported by the pivot means such that the valve plate is translationally movable relative thereto in directions suitable for altering net torque to be exerted on the valve plate by the fluid, and rotationally movable over a range of rotational positions in order to variably permit flow along the path; the pivot means comprising a carrier which is rotatable with the valve plate over the range of rotational positions, and a shaft which is rotatable relative to the carrier and secured thereto; and power transmission means secured to the valve plate and shaft for converting rotational movement of the shaft to translational movement of the valve plate.

2. The invention of claim 1 further comprising bearing means for minimizing friction during translational movement of the valve plate relative to the carrier.

3. The invention of claim 2 wherein the bearing means is secured to the carrier and abuts the valve plate.

4. The invention of claim 2 wherein the power transmission means comprises a first gear rigidly secured to the shaft and a second gear rigidly secured to the valve plate and engaged with the first gear, and wherein the carrier and bearing means are cooperative to limit load-bearing by the first and second gears when the valve plate is subjected to pressure exerted thereon by the fluid.

5. The invention of claim 4 wherein the bearing means is secured to the carrier and abuts the valve plate.

6. The invention of claim 4 wherein the carrier is a second shaft having a centrally-disposed, longitudinally-extending portion which is substantially coextensive with the valve plate and two longitudinally-extending end portions separated by the centrally-disposed portion and journalled in the mounting body.

7. The invention of claim 6 wherein one of the end portions extends through the mounting body outside of the flow path whereby the rotational position of the valve plate is ascertainable by reference to the rotational position of the one end portion.

8. The invention of claim 7 wherein the shaft is journalled in the second shaft.

9. The invention of claim 1 wherein the carrier is a second shaft comprising a first longitudinally-extending portion journalled in and extending through the mounting body outside of the flow path whereby rotational position of the valve plate is ascertainable by reference to rotational position of the longitudinally-extending portion, and a second longitudinally-extending portion substantially coextensive with the valve plate.

10. The invention of claim 9 further comprising bearings secured to the second longitudinally-extending portion of the second shaft for minimizing friction between the second shaft and the valve plate during translational movement of the latter.

11. The invention of claim 10 wherein the valve plate has a cavity formed therein, the cavity being coextensive with the valve plate in a direction substantially transverse to the flow path; substantially the entire second longitudinally-extending portion of the second shaft extending into the cavity whereby fluid flow along the path is substantially unobstructed by the second shaft.

12. The invention of claim 11 wherein the shaft is journalled in the second shaft and extends into the cavity.

13. The invention of claim 12 wherein the power transmission means comprises a first gear rigidly secured to the shaft and a second gear rigidly secured to the valve plate, the first gear extending transversely through the second shaft to engage the second gear.

14. The invention of claim 13 wherein the second shaft and bearings are cooperative to limit load-bearing by the first and second gears when the valve plate is subjected to pressure exerted by the fluid.

15. A butterfly valve, comprising:
a mounting body defining a flow path for a fluid to be conveyed therethrough;
a valve plate pivotally supported in the mounting body and disposed in the flow path, the valve plate being rotatable within the flow path to modulate fluid flow, the valve plate being translatable within the flow path to minimize net torque exerted thereon by the fluid, the valve plate having a cavity formed therein;
a rotatable shaft supported in the mounting body and extending into the cavity, the cavity accommodating translational movement of the valve plate relative to the shaft in a direction substantially parallel to the former; and
power transmission means secured to the shaft and valve plate for converting rotational movement of the shaft to the translational movement of the valve plate.

16. The invention of claim 15 wherein the power transmission means is disposed in the cavity.

17. The invention of claim 15 wherein the power transmission means comprises a rack gear secured to the valve plate and a pinion gear secured to the shaft and in engagement with the rack gear.

18. The invention of claim 17 wherein the rack and pinion gears are disposed in the cavity.

19. A butterfly valve, comprising:
a mounting body defining a flow path for a fluid to be conveyed therethrough;
a valve plate supported and movable in the flow path and secured to the mounting body, the valve plate being rotatable within the flow path to modulate fluid flow and translatable within the flow path to minimize net torque exerted thereon by the fluid, the valve plate having a cavity formed therein, the cavity being coextensive with the valve plate in a direction substantially transverse to the flow path;
pivot means supported by the mounting body for supporting the valve plate, the pivot means extending through the cavity in the direction substantially transverse to the flow path, the cavity accommodating translational movement of the valve plate relative to the pivot means; and
power transmission means secured to the pivot means and valve plate for converting rotational movement in the pivot means to the translational movement of the valve plate.

20. The invention of claim 19 wherein the power transmission means is disposed in the cavity.

21. The invention of claim 19 wherein the power transmission means comprises a rack gear secured to the valve plate and a pinion gear secured to the pivot means and engaging the rack gear.

22. The invention of claim 21 wherein the rack and pinion gears are disposed in the cavity.

23. The invention of claim 19 wherein the pivot means comprises a carrier rotatable with the valve plate and a center shaft rotatable relative to the carrier.

24. The invention of claim 23 wherein the power transmission means comprises a rack gear rigidly secured to the valve plate and a pinion gear rigidly secured to the center shaft and in engagement with the rack gear.

25. The invention of claim 24 wherein the rack and pinion gears are disposed in the cavity.

* * * * *